(12) United States Patent
Smith et al.

(10) Patent No.: US 6,819,797 B1
(45) Date of Patent: Nov. 16, 2004

(54) METHOD AND APPARATUS FOR CLASSIFYING AND QUERYING TEMPORAL AND SPATIAL INFORMATION IN VIDEO

(75) Inventors: John R. Smith, New Hyde Park, NY (US); Chung-Sheng Li, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/493,879

(22) Filed: Jan. 28, 2000

Related U.S. Application Data

(60) Provisional application No. 60/117,906, filed on Jan. 29, 1999.

(51) Int. Cl.[7] .............................. G06K 9/00; G06K 9/34; G06K 9/54; G06K 9/60; G06F 17/30; G06F 7/00
(52) U.S. Cl. ........................ 382/181; 707/3; 707/104.1; 382/180; 382/306
(58) Field of Search ................................ 382/180, 181, 382/305, 306; 707/3, 6, 10, 4.1

(56) References Cited

U.S. PATENT DOCUMENTS

| | | | | |
|---|---|---|---|---|
| 4,799,270 A | * | 1/1989 | Kim et al. ................... | 382/205 |
| 5,357,250 A | * | 10/1994 | Healey et al. ............... | 341/107 |
| 5,684,999 A | * | 11/1997 | Okamoto ....................... | 704/9 |
| 5,923,380 A | * | 7/1999 | Yang et al. ................... | 348/586 |
| 6,253,201 B1 | * | 6/2001 | Abdel-Mottaleb et al. ..... | 707/4 |
| 6,400,853 B1 | * | 6/2002 | Shiiyama .................... | 382/305 |
| 6,446,060 B1 | * | 9/2002 | Bergman et al. ............... | 707/3 |
| 6,490,370 B1 | * | 12/2002 | Krasinski et al. ........... | 382/195 |
| 6,564,263 B1 | * | 5/2003 | Bergman et al. ............ | 709/231 |

* cited by examiner

*Primary Examiner*—Leo Boudreau
*Assistant Examiner*—Hussein Akhavannik
(74) *Attorney, Agent, or Firm*—Thu Ann Dang; Anne V. Dougherty

(57) ABSTRACT

A method and apparatus for classifying or annotating image and video content by assigning each class of event, action, region or object a unique symbol and then building symbol strings to represent sequences in space or time. The symbol strings can be decoded using a library of annotated PT descriptors to automatically label the image and video content. Furthermore, the PT descriptors can be used for searching by sketch or searching by example where the search query input is converted to symbol strings, which are efficiently compared based on the presence and relative counts of PT descriptors mapped into a PT matrices. The Precedence Template (PT) descriptor can be used for classifying and querying video based on the spatial and temporal orderings of regions, objects, actions or events. Applied to video, the PT descriptors provide a way to compare the temporal order of events, actions, or objects such as those represented in a scene transition graph, key-frame list, or event string. Applied to images, the PT descriptors provide a way to compare the spatial arrangement of image regions or objects. By capturing the spatial and temporal relationships statistically, the PT descriptors provide a robust way to measure similarity in the presence of insertions, deletions, substitutions, replications and relocations of events, actions, regions or objects.

25 Claims, 5 Drawing Sheets

METHOD AND APPARATUS FOR CLASSIFYING AND QUERYING TEMPORAL AND SPATIAL INFORMATION IN VIDEO

This application claims the benefit of Provisional application Ser. No. 60/117,906, filed Jan. 29, 1999.

FIELD OF THE INVENTION

The present invention relates to a method and apparatus for classifying and querying temporal and spatial information in media content; for representing objects, regions, events, actions, scenes, and visual features using symbols; for constructing symbol string descriptors that order the symbols in time or space to represent temporal or spatial information; for computing precedence template descriptor matrices from the symbol strings to describe the temporal and spatial ordering of the symbols statistically; for comparing precedence template descriptor matrices in order to compare the temporal or spatial information in the video or images; for classifying video and images using symbols strings and precedence template descriptors; and for querying video and images using symbol strings and precedence template descriptors.

BACKGROUND OF THE INVENTION

The growing proliferation of digital photographs and video is increasing the need for more sophisticated methods for automatically analyzing, cataloging, and searching for digital representations of media content. The recent development of content-based query systems has advanced the capabilities for searching for images and video by color, texture, shape, motion and other features. Content-based methods are effective in allowing searching by feature similarity but are limited in capability of automatically deriving higher semantic level understanding of the content. Content-based methods can improve searching and attain better understanding of the content by capturing spatial and temporal information in addition to these features. In particular, effective methods are needed for describing scene and temporal information represented by the composition of region, objects or events in space or time.

Since humans perceive images by breaking the scenes into surfaces, regions, and objects, the spatial, temporal and feature attributes of the objects and the relationships to each other are important characteristics of visual information. Content-based retrieval systems that use global descriptors, such as color histograms miss the important spatial information. Furthermore, in a large collection of photographs, many regions recur, such as those that correspond to blue skies, oceans, grassy regions, orange horizons, mountains, building facades, and so forth. For photographic images, therefore, the detection and description of these regions and their spatial relationships is essential for truly characterizing the images for searching, classification and filtering purposes. Similarly, in video, the temporal relationships of events and objects are important features of the video content. Effectively describing the temporal composition features is essential for searching and filtering video by content.

There are many ways to capture the region information in images. Some recent approaches include 2-D strings, θ-R representations, local histograms, co-occurrence matrices, and region or event tables. However, composition descriptors such as the 2-D string and its variants are brittle in the sense that minor changes in region locations can greatly affect the comparison of two images. Descriptors such as θ-R and co-occurrence matrices are not widely applicable due to sensitivity to scale, which is problematic when comparing images of different resolutions or video segments of different temporal durations. Region or event tables are general in the sense that they capture the spatial and temporal locations, however, they do not provide a solution for measuring spatial or temporal similarity.

What is needed, therefore, and what is an object of the present invention, is to provide a system and method for characterizing media content by spatial and/or temporal ordering of regions, objects, or events.

It is another object of the invention to provide a system and method for classifying media content by the representations of spatial and/or temporal ordering.

Yet another object of the invention is to provide a system and method for searching stored media content by use of the classification by representations of spatial and/or temporal ordering.

SUMMARY OF THE INVENTION

In accordance with the aforementioned needs and objects, the present invention is directed towards an apparatus and method for classifying and querying temporal and spatial information in video; for representing objects, regions, events, actions, scenes, and visual features using symbols; for constructing symbol string descriptors that order the symbols in time or space to represent temporal or spatial information; for computing precedence template descriptor matrices from the symbol strings to describe the temporal and spatial ordering of the symbols statistically; for comparing precedence template descriptor matrices in order to compare the temporal or spatial information in the video or images; for classifying video and images using symbols strings and precedence template descriptors; and for querying video and images using symbol strings and precedence template descriptors.

Precedence Template (PT) descriptors of the present invention can be used for classifying or annotating image and video content by assigning each class of event, action, region or object a unique symbol and then building symbol strings to represent sequences in space or time. The symbol strings can be decoded using a library of annotated PT descriptors to automatically label the image and video content. Furthermore, the PT descriptors can be used for searching by sketch or searching by example where the search query input is converted to symbol strings, which are efficiently compared based on the presence and relative counts of PT descriptors. The Precedence Template (PT) descriptor can be used for classifying and querying video based on the spatial and temporal orderings of regions, objects, actions or events. Applied to video, the PT descriptors provide a way to compare the temporal order of events, actions, or objects such as those represented in a scene transition graph, key-frame list, or event string. Applied to images, the PT descriptors provide a way to compare the spatial arrangement of image regions or objects. By capturing the spatial and temporal relationships statistically, the PT descriptors provide a robust way to measure similarity in the presence of insertions, deletions, substitutions, replications and relocations of events, actions, regions or objects.

BRIEF DESCRIPTION OF THE DRAWINGS

The invention will now be described in detail with specific reference to the appended drawings wherein.

DETAILED DESCRIPTION OF A PREFERRED EMBODIMENT OF THE INVENTION

Figures 1A, 1B:
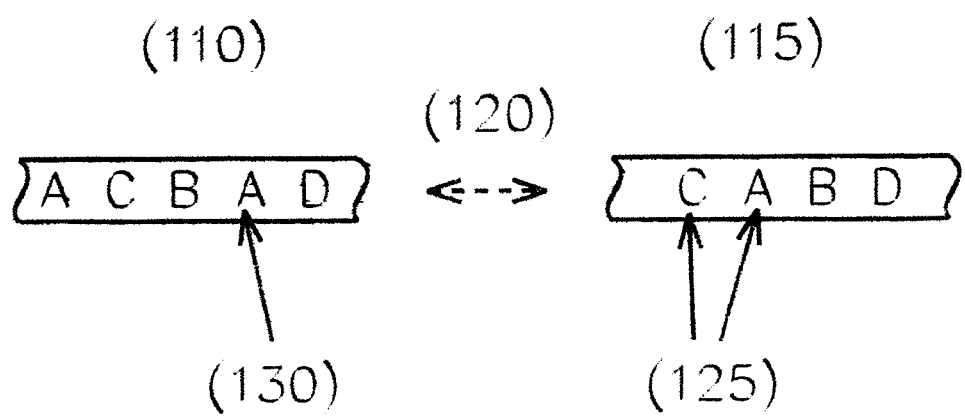
FIG. 1A provides a symbol table with symbols corresponding to actions and FIG. 1B shows a comparison of temporal sequences of actions by comparison of two symbol strings.

Under the present invention, it is understood that a descriptor of interest for each region, object or event of the media content belongs to a finite and countable set of descriptors. Each descriptor is represented by a symbol and the implication is that the symbol dictionary is finite. By definition, therefore, a symbol s corresponds to the index value of an annotation or feature descriptor prototype in a finite dictionary of annotations or prototypes.

For example, in a dictionary of activities $D_{activity}$={run, swim, jump, rest}, each symbol corresponds to an activity as follows: $s_0$=run, and $s_1$=swim, and so forth. In a dictionary of color prototypes, $D_{color}$={red, blue, green, dark green, yellow}, each symbol corresponds to a color as follows: $s_0$="red", $s_1$="blue" and so forth.

In order to represent the spatial or temporal order of the regions, objects, or events of media content, the present invention provides symbol strings. A symbol string S is a series of symbols $S=s_0 s_1 s_2, \ldots, s_{N-1}$ that gives the order of the symbols in time or space, where S[i] and S[i+] are consecutive in time or space.

For example, in the temporal activity symbol string corresponding to the dictionary $D_{activity}$={run, swim, jump, rest}, symbol string $S=s_0 s_2 s_1 s_0 s_3$ describes the order of activities, where the order is run, jump, swim, run, rest. A symbol string forms the starting point for the PT descriptors, where the symbols represent attributes or descriptors of regions, objects or events of the content, and the strings represent the order of the regions, objects or events in space or time. In practice, the symbol strings can represent many types of spatial or temporal information. For example, the symbol strings can represent the vertical order of color regions in a spatial scan of color photographs. Symbol strings can also be used to represent the series of actions in a movie, or scene locations in a television program. As another example, a symbol string can represent the motion direction of an object over time or a series of annotations of person, time or place.

Once symbol strings have been constructed for representing the spatial or temporal ordering of the content represented by the symbols, the ordering information can be utilized for providing statistical information useful in classifying and storing representations and for querying the stored representations. Using the symbol strings, a precedence template (hereinafter "PT") can be developed. A precedence template (PT), T, defines a relative ordering of M symbols, $T=t_0 t_2, \ldots, t_{M-1}$, where T[i] precedes T[i+j] in a symbol string S for j>0.

For example, given the dictionary $D_{activity}$={run, swim, jump, rest}, and the symbol string $S=s_0 s_2 s_1 s_3$, then $T=s_2 s_1$ gives that run preceded swim in S. While the preferred embodiment provides for ordering based on precedence, it will be understood that another established ordering relationship could be used as the template. The instances of the PTs in a symbol string can be counted using a PT test. The PT test for $T=t_0 t_1$ in symbol string S is given by the indicator function I(S,T),
where $$I(T, S) = \sum_{n=0}^{N-1} \sum_{m=n+1}^{N-1} \begin{cases} 1 & S[n] = T[0] \text{ and } S[m] = T[1] \\ 0 & ow \end{cases}$$

where $$I(T, S) = \sum_{n=0}^{N-1} \sum_{m=n+1}^{N-1} \begin{cases} 1 & S[n] = T[0] \text{ and } S[m] = t[1] \\ 0 & ow \end{cases}$$

For example, the PT test gives that I(T,S)=2 for $T=s_0 s_3$ in symbol string $S=s_0 s_2 s_1 s_3$. For $D_{activity}$={run, swim, jump, rest}, this indicates that the activity run was carried out before the activity rest. The PT test forms the basis for generating a PT descriptor matrix which summarizes the counts of the PTs in the symbol string.

Figure 2:
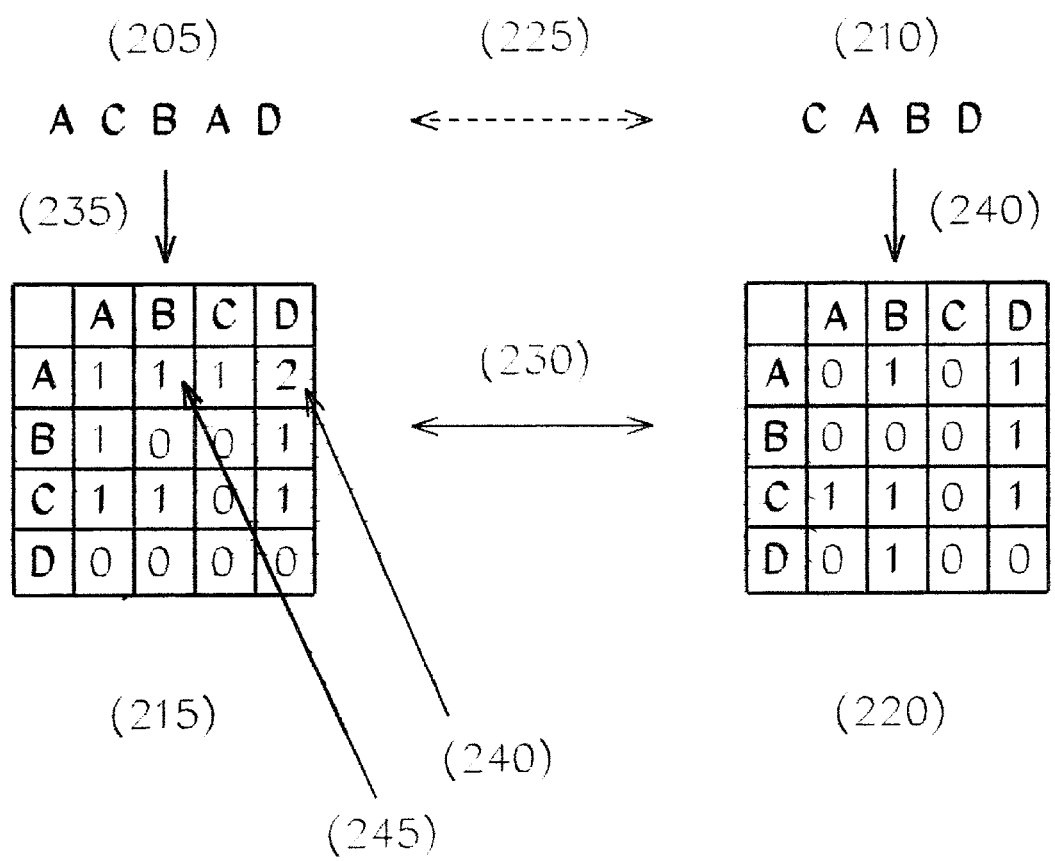
FIG. 2 shows a comparison of symbol strings using PT descriptor matrices, wherein each entry in a PT descriptor matrix counts the number of times a symbol precedes another symbol in the symbol string.

A precedence template (PT) descriptor matrix, M[i,j], of a symbol string S, gives the count of each PT $T=s_i s_j$ in S. Each symbol is mapped to a vertical column location and a horizontal row location, as depicted in FIG. 2 (further detailed below). Each entry in the PT descriptor matrix provides a count of the number of times that a given symbol (the symbol for the matrix row) preceded another particular symbol (the symbol for the matrix column) in the symbol string. The PT descriptor matrices form the basis of the information needed for comparing the symbol strings for searching and classifying spatial and temporal information.

With specific reference to the drawings, for developing the PT descriptor relating to a temporal sequence of events or spatial series of regions, first each event or region is assigned a symbol value, as illustrated in FIG. 1A. Each symbol value (125) can represent an attribute or descriptor of the event, such as name, place, action (130), and so forth, or a feature of a region, such as color, texture, shape or motion. In practice, for video, the temporal sequence can represent a list of scenes derived from shot detection and key-frame selection algorithms. The spatial and temporal order of the events, actions, regions, and so forth, can be represented as symbol strings (110, 115). In order to compare the video or images by spatial or temporal content, the symbol strings (110 and 115) need to be compared (120), as illustrated in FIG. 1B. Several problems emerge, including the following: how to deal with insertions, deletions, substitutions, replications and relocations of symbols; how to deal with sequences of different lengths; and, how to do partial matching.

Many of the problem cases are illustrated in FIG. 1B. For example, the action sequence represented in symbol string "C-A-B-D" (115) differs from that represented in the symbol string "A-C-B-A-D" (110) in that the order of the two initial activities has been reversed ("A"=run, "B"=swim) (125) in the second string. Also, in the second action sequence, one of the instances (130) of an action ("A"=run) is missing.

The Precedence Template (PT) descriptors of the present invention provide a way to compare the symbol sequences in a statistical fashion in order to provide a measure for similarity. The PT descriptors are generated by mapping the symbol strings into a PT descriptor matrix, where entry (i,j) in the PT descriptor matrix indicates the count n(i,j) of the instances in which symbol i preceded symbol j in the symbol string.

FIG. 2 shows how the symbols strings (205 and 210) can be compared using PT descriptors. For example, in the string "A-C-B-A-D" (205), A preceded D twice, and B preceded A once, and so forth. This is represented in the PT descriptor matrix (215) as an entry of 2 (240) in row "A"—column "D", and as an entry of "1" (245) in row "B"—column "A". These counts in the PT descriptor matrices form the basis for comparing (at 225) the symbol strings (205 and 210) in the presence of insertions, deletions, substitutions, replications, and relocations of symbols by comparing (230) the PT descriptor matrices (215 and 220). By generating and comparing the PT descriptor matrices for stored content, the content can be classified and more readily searched based on the PT descriptors. The process by which a classified database is constructed parallels the query and comparison process for searching, as further detailed below.

For classification and search applications, the query system typically needs to return the top-ranked items that are most similar to the query item. Where each target item has a symbol string, or PT descriptor matrix, the query is generated by constructing a symbol string or descriptor matrix as the search input. This can be done automatically by supplying a query image, by choosing one of the target images as an example image, or by sketching the query image. Once the system has the query input, it will assign one or more symbol strings to the input and then construct a PT descriptor matrix from those symbol strings using the PT Test described above. It is also possible that the query input comprises an input symbol string or a symbol string selected from a query menu. If symbol strings are given, then the PT descriptor matrices are automatically generated using the PT Test.

In order to compare the items based on spatial and temporal information, the query computes the similarity of query PT descriptor matrix $M_q$ to those of the target items $M_t$ as follows: Precedence Template (PT) Descriptor similarity. The similarity of PT descriptor matrices $M_q$ and $M_t$ is given by $$\Theta_{q,t} = \sum_i \left( \frac{1}{C_q[i]} \frac{1}{C_t[i]} \right) \sum_j M_q[i, j] M_t[i, j],$$

where $C_q[i]$ and $C_q[i]$ give the count of the instances of each symbol $S_i$ in the query and target symbols strings, which is computed from:

$$C_i = \left| \sum_j M[i, j] - \sum_j M[j, i] \right|.$$

For classifying stored content, given a set of semantic classes, a PT descriptor library is generated by pooling together the PT descriptors in each semantic class. For each semantic class, the PT library gives the likelihood that each PT is found in that class. The pooling process is carried out as follows: the frequency of each PT, $T_i$, in a set of symbol strings $\{S_j\}$ is then given by $P(T_i)$, where $$P(T_i) = \sum_j I(T_i, S_j).$$

The frequency of each PT, $T_i$, in the set of symbol strings $\{S_j\}_k$ from semantic class $C_k$ is given by $P(T_i|C_k)$, where $$P(T_i|C_k) = \sum_{\forall j\, S_j \in C_k} I(T_i, S_j).$$

The pooled PTs form the PT library wherein the precedence template(PT) library is given by the set of tuples:

$$[T_i, P(T_i), P(T_i|C_0), P(T_i|C_1), \ldots, P(T_i|C_{k-1})],$$

where K is the number of semantic classes. The $P(T_i|C_k)$'s reflect the frequencies of the PT descriptors in the semantic classes. For each $T_i$, the PT library gives the frequencies in which $T_i$ is found in each semantic class, $P(T_i|C_k)$, and in the entire collection, $P(T_i)$. The symbol strings and the PT library form the basis for content classification by assigning each item to the closest semantic class in the PT library.

Content is classified as follows: for each $T'_i$ from the unknown image, $P(C_k|T'_i)$ is computed from the entries in the PT library:

$$P(C_k|T'_i) = \frac{P(T'_i|C_k)}{P(T'_i)}.$$

The items are classified by the following Precedence Template (PT) Descriptor classification process whereby the system assigns item i to class l when $$\forall_{l \neq k},\ \sum_i P(C_l | T'_i) \geq \sum_i P(C_k | T'_i).$$

Figures 3A, 3B:
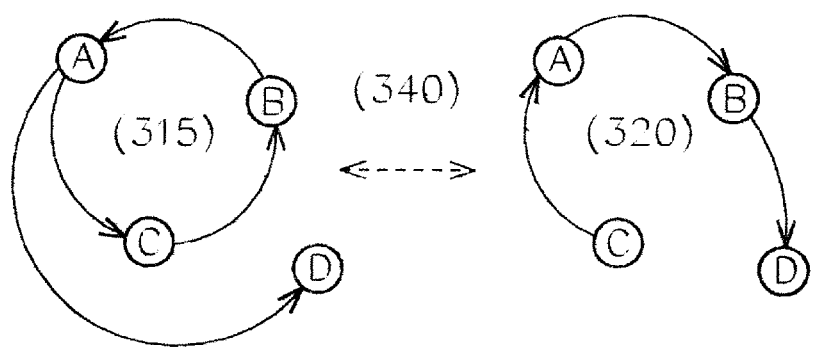
FIG. 3A shows a table of symbols corresponding to scenes and FIG. 3B shows a scene transition graph which provides a way to describe the temporal transitions between scenes in video by providing a visualization of the scene lists.

For video, the PT descriptor can be used to describe the temporal order of events, actions, regions or objects. For example, the PT descriptor can be used to compare (340) scene transition graphs (315 and 320), as illustrated in FIGS. 3A and 3B. The scene-transition graphs of FIG. 3B can be generated from the symbol strings (325 and 330) that represent the temporal order of scenes (310) in terms of the scene symbols (305) which are assigned according to the table of FIG. 3A. In the case of scene transitions, a PT descriptor matrix counts the number of times each scene has preceded each other scene.

Figure 4:
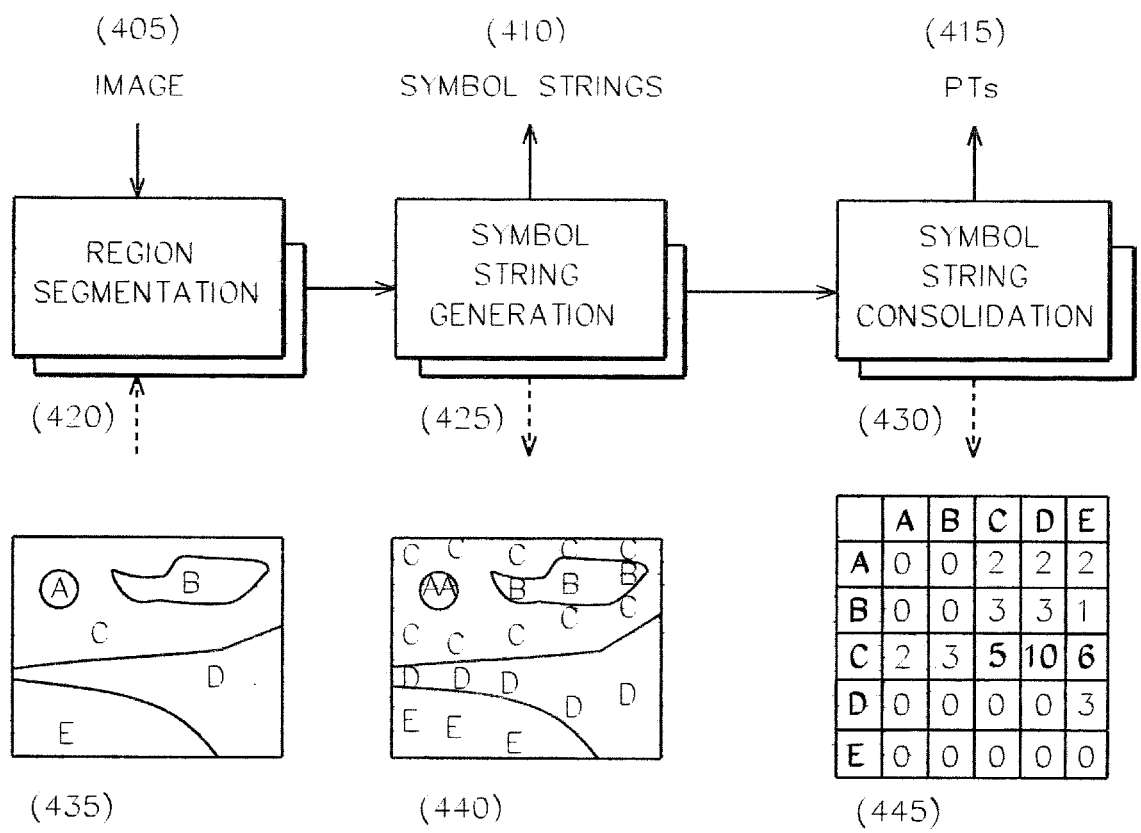
FIG. 4 shows how a PT descriptor matrix can be automatically generated from images by segmenting the image, assigning a symbol to each region, scanning the regions, and counting the number of PT instances.

For images, the PT descriptor can be used to describe the spatial order of regions or objects (440). The PT descriptor process can work in conjunction with image segmentation algorithms (420). For example, considering the case of color segmentation of images, the PT descriptors can be generated as illustrated in FIG. 4. In the case of color region segmentation, the system first segments the image (405) into regions (420) and assigns each region a symbol that indicates its color (435). Then, the system extracts a number of symbol strings by scanning the segmented images in vertical scans (440) and reading-off the symbols to generate (425) the symbol strings (410). The system compute the PTs for the symbol strings and pools them together (430) to create a PT descriptor matrix (445). The system uses the PT descriptors (415) in order to compare, classify and search for images.

Figure 5:
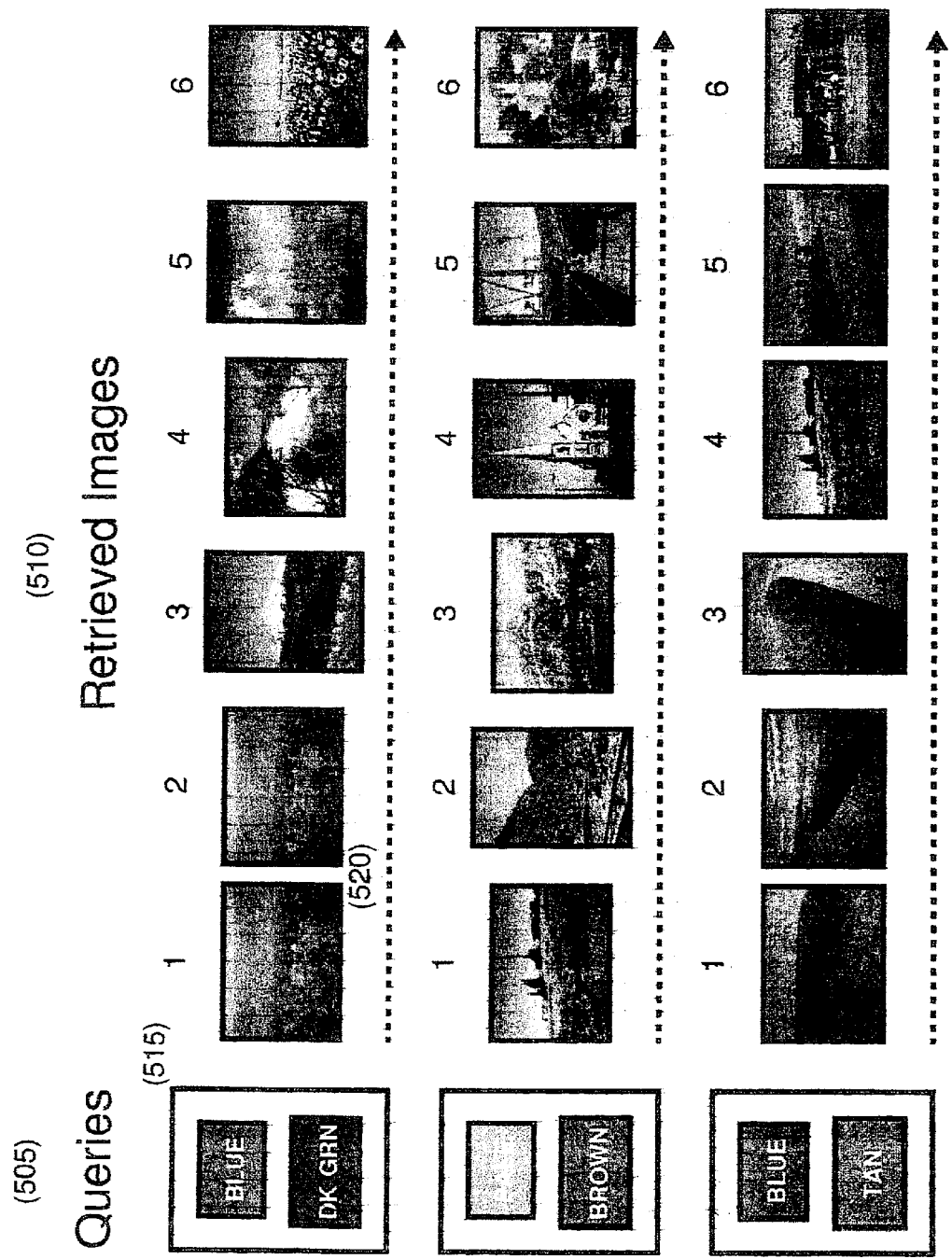
FIG. 5 shows example graphical image queries in which the PT descriptors are generated by graphically placing color regions on a query grid.

In image and video retrieval, the query can be formulated either graphically or by example. In graphical querying, the user sketches the query by placing regions on a query grid. In query by example, the user selects an image that typifies those the user is looking for. In both cases, the query system computes the symbol strings and PT descriptors for the query image and uses them to retrieve (510) the target images from the collection. The PT method allows fast matching of images in graphical querying, as illustrated in FIG. 5. The user places the color regions on a grid to construct a coarse depiction of the scenes of interest (505). The set of query PT descriptors are obtained by scanning the query grid and generating and consolidating the symbol strings for the query. The matching is then performed directly between the query PT descriptors and those for the target images.

For example, in the first query in FIG. 5, the user places two regions, one for blue sky, and another for green field on the query grid (515). The retrieved images have the best match to the query in terms of the composition of the color regions (520). The best six matches are illustrated on the right in FIG. 5. In the next example query, the user places a pale blue region above a brown region. The scenes in the retrieved images match the query in terms of color and location of the regions. In the last example query, the user places a blue region above a tan region. The first five retrieved images in which the blue region matches to sky and the tan region matches to sand.

The Precedence Template (PT) descriptor provides a way for classifying and querying video based on the spatial and temporal orderings of regions, objects, actions or events. Applied to video, the PT descriptors provide a way to compare the temporal order of events, actions, or objects such as those represented in a scene transition graph, keyframe list or event string. Applied to images, the PT descriptors provide a way to compare the spatial arrangement of image regions or objects. By capturing the spatial and temporal relationships statistically, the PT descriptors provide a robust way to measure similarity in the presence of insertions, deletions, substitutions, replications and relocations of these events, actions, regions or object.

While the invention has been described with reference to the preferred embodiment, it will be apparent to one having skill in the art that modifications can be made without departing from the spirit and scope of the invention as set forth in the appended claims.

Having thus described our invention, what is claimed is:

1. A method for generating descriptors for media content comprising the steps of:
   assigning a plurality of content symbols to each of a plurality of content components;
   ordering the plurality of content symbols based on their relationships to each other in the content; and
   evaluating the ordering of said plurality of content symbols.

2. The method of claim 1 wherein said evaluating the ordering comprises the steps of:
   determining the frequency of each of said plurality of content symbols having a specific relationship to another of said plurality of content symbols; and
   assigning content symbol relationship values based on said frequency.

3. The method of claim 2 further comprising mapping said content relationship values into a matrix.

4. The method of claim 3 further comprising comparing content relationship values for a plurality of media content and classifying said media content based on said comparing.

5. The method of claim 4 wherein said classifying comprises the steps of:
   identifying a plurality of classes for classifying media content;
   determining the frequency of each of said plurality of content symbols having a specific relationship to another of said plurality of content symbols within each of said plurality of classes;
   assigning class symbol relationship values based on said frequency; and
   forming a pooled class matrix for each of the plurality of classes based on said class symbol relationship values.

6. The method of claim 4 further comprising storing content relationship values for a plurality of media content.

7. The method of claim 6 further comprising searching said stored content relationship values for similarity to query input.

8. The method of claim 7 wherein said searching comprises the steps of:
   receiving search input;
   assigning a plurality of query symbols to each of a plurality of query components; and
   ordering the plurality of query symbols based on their relationship in the query content;
   evaluating the ordering of said plurality of query symbols by determining the frequency of each of said plurality of query symbols having a specific relationship to another of said plurality of query symbols and assigning query symbol relationship values based on said frequency; and
   comparing the query symbol relationship values to the content symbol relationship values.

9. The method of claim 8 wherein receiving search input comprises receiving a sketch.

10. The method of claim 8 wherein receiving search input comprises providing a query grid comprising query options and receiving user input onto said query grid.

11. The method of claim 8 wherein said comparing comprises comparing at least one matrix of content symbol relationship values with a matrix of query symbol relationship values.

12. The method of claim 1 wherein the ordering comprises spatial ordering of image content.

13. The method of claim 1 wherein the ordering comprises at least one of spatial ordering and temporal ordering of video content.

14. A system for providing descriptors for media content comprising:
   a symbol table component for assigning a plurality of content symbols to each of a plurality of content components;
   a symbol string component for ordering the plurality of content symbols based on their relationships to each other in the content; and
   a processing component for evaluating the ordering of said plurality of content symbols.

15. The system of claim 14 wherein the processing component for evaluating the ordering comprises:
   an analysis component for determining the frequency of each of said plurality of content symbols having a specific relationship to another of said plurality of content symbols; and
   a value component for assigning content symbol relationship values based on said frequency.

16. The system of claim 15 further comprising at least one storage component for storing the content symbol relationship values.

17. The system of claim 16 further comprising search input interface for receiving query content.

18. The system of claim 17 further comprising a search engine comprising:
- a symbol table component for assigning a plurality of query symbols to each of a plurality of query components;
- a symbol string component for ordering the plurality of query symbols based on their relationships to each other in the query content;
- a processing component for evaluating the ordering of said plurality of query symbols, including an analysis component for determining the frequency of each of said plurality of query symbols having a specific relationship to another of said plurality of query symbols; and
- a value component for assigning query symbol relationship values based on said frequency; and
- a comparator component for comparing query symbol relationship values to content symbol relationship values stored in said storage component.

19. The system of claim 18 wherein said comparator component compares at least one matrix of stored content symbol relationship values with a matrix of query symbol relationship values.

20. The system of claim 18 further comprising a classification component for evaluating the frequency of each of said plurality of content symbols having a specific relationship with another of said plurality of content symbols within a defined class and for assigning class symbol relationship values based on said frequency and wherein said comparator additionally compares said class symbol relationship values with said query symbol relationship values.

21. The system of claim 17 wherein said search input interface comprises a graphical input device for receiving a sketch.

22. The system of claim 17 wherein said search input interface comprises display processing means for providing a query grid comprising query options and for receiving user input onto said query grid.

23. The system of claim 14 further comprising a classification component for evaluating the frequency of each of said plurality of content symbols having a specific relationship with another of said plurality of content symbols within a defined class and for assigning class symbol relationship values based on said frequency.

24. A program storage device readable by machine, tangibly embodying a program of instructions executable by the machine to perform method steps for generating descriptors for media content, said method comprising the steps of:
- assigning a plurality of content symbols to each of a plurality of content components;
- ordering the plurality of content symbols based on their relationships to each other in the content; and
- evaluating the ordering of said plurality of content symbols by determining the frequency of each of said plurality of content symbols having a specific relationship to another of said plurality of content symbols.

25. An improved descriptor stored on a program storage device readable by machine for describing and handling media content which can be characterized by a plurality of content symbols, the improvement comprising a content symbol relationship value assigned based on the frequency of each of said plurality of content symbols having a specific relationship to another of said plurality of content symbols.

* * * * *